US008678320B2

(12) United States Patent
Yamaguchi et al.

(10) Patent No.: US 8,678,320 B2

(45) Date of Patent: Mar. 25, 2014

(54) AIRCRAFT FUEL TANK

(75) Inventors: Hiroaki Yamaguchi, Nagoya (JP); Yuichiro Kamino, Nagoya (JP); Tooru Hashigami, Nagoya (JP); Kazuyuki Oguri, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 283 days.

(21) Appl. No.: 13/131,063

(22) PCT Filed: Jun. 24, 2009

(86) PCT No.: PCT/JP2009/061504

§ 371 (c)(1), (2), (4) Date: Jul. 14, 2011

(87) PCT Pub. No.: WO2010/064463

PCT Pub. Date: Jun. 10, 2010

(65) Prior Publication Data

US 2011/0284694 A1 Nov. 24, 2011

(30) Foreign Application Priority Data

Dec. 1, 2008 (JP) ................................ 2008-306573

(51) Int. Cl.
*B64D 37/02* (2006.01)

(52) U.S. Cl.
USPC ...................................... 244/135 R; 220/562

(58) Field of Classification Search
USPC ....... 244/123.14, 123.3, 123.5, 135 B, 135 R; 220/562, 563, 564
See application file for complete search history.

(56) References Cited

U.S. PATENT DOCUMENTS

| | | | | |
|---|---|---|---|---|
| 4,630,789 | A * | 12/1986 | Rosenberg | 244/135 R |
| 4,654,747 | A | 3/1987 | Covey | |
| 4,985,801 | A | 1/1991 | Hellard et al. | |
| 2003/0218098 | A1 | 11/2003 | Goto et al. | |

FOREIGN PATENT DOCUMENTS

| | | |
|---|---|---|
| JP | 2572830 | 1/1997 |
| JP | 2003-226296 | 8/2003 |
| WO | 89/00263 | 1/1989 |

OTHER PUBLICATIONS

Canadian Office Action issued Dec. 5, 2012 in corresponding Canadian Patent Application No. 2,745,375.

"Imparting Conductivity" in Electrostatic Handbook, pp. 287-289, The Institute of Electrostatics Japan, Ohmsha, 2006 w/partial English translation.

(Continued)

*Primary Examiner* — Timothy D Collins
*Assistant Examiner* — Nicholas McFall
(74) *Attorney, Agent, or Firm* — Wenderoth, Lind & Ponack, L.L.P.

(57) ABSTRACT

An aircraft fuel tank that is capable of suppressing the occurrence of sparks on a pipe caused by a lightning current through the pipe during a lightning strike, and also suppressing static electricity charging of a pipe caused by flow electrification generated by the fuel. An aircraft fuel tank (1) in which a storage section is formed using a conductive upper skin (5), a conductive lower skin (7) and conductive spars (9), the tank comprising: pipes inside the tank, such as a refuel pipe (17), an engine feed pipe (19) and an inert gas pipe (21), which are disposed inside the storage section and are earthed (27) at a plurality of locations, and pipe outer surface layers (31) having semiconductor properties that are formed in an integrated manner on the outer surfaces of the pipes inside the tank such as the replenishing pipe (17), the supply pipe (19) and the gas pipe (21).

4 Claims, 2 Drawing Sheets

(56) References Cited

OTHER PUBLICATIONS

Decision to Grant a Patent issued Nov. 13, 2012 in corresponding Japanese Patent Application No. 2008-306573 with explanation of relevance.

International Search Report issued Aug. 18, 2009 in International (PCT) Application No. PCT/JP2009/061504.

Supplementary European Search Report dated Jul. 8, 2013 in corresponding European Patent Application No. 09830233.4.

* cited by examiner

17(21)
23
25
25
27
23
27
33
29
31
27
25
25
23

AIRCRAFT FUEL TANK

TECHNICAL FIELD

The present invention relates to an aircraft fuel tank.

BACKGROUND ART

In recent years, almost all aircraft fuel tanks are so-called integral tanks such as those described in Patent Literature 1, wherein the airframe structure itself forms a portion of the tank container. In one example of an integral tank, the region enclosed by the front spar, the rear spar, and the upper and lower wing panels, which represent sections of the main wing, is used as a tank. In other words, these airframe structures are used as a container for storing fuel.

Pipes such as a fuel pipe for supplying fuel and an inert gas pipe for supplying an inert gas are installed inside this tank.

On the other hand, materials that are lightweight, high-strength and provide good durability are in demand for the airframe materials such as the main wing of the aircraft, and for example, light metal materials such as aluminum alloys are widely used.

In recent years, as these demands have grown stronger, the use of resin materials that have been reinforced with fiber (composite materials) as airframe materials is becoming more widespread.

For example, carbon fiber reinforced plastics (CFRP) prepared by immobilizing carbon fibers within an epoxy resin or the like are widely used as these composite materials.

CITATION LIST

Patent Literature

{PTL 1} Japanese Unexamined Patent Application, Publication No. 2003-226296

SUMMARY OF INVENTION

Technical Problem

However, if a CFRP is used for the skins and spars of the main wing, and a good conductor such as an aluminum alloy is used for the pipes, then when the pipes are bonded to the airframe structure, there is a danger that lightning current from a lightning strike may flow through the pipes, causing a spark at a pipe joint or the like.

Further, if the bonding of the pipes is not performed appropriately, then the difference in resistance values causes an increase in the potential difference between the CFRP structure and the aluminum alloy pipe, increasing the danger of spark occurrence.

In order to prevent these problems, thought has been given to forming the pipes from an insulator such as a glass fiber reinforced plastic (GFRP) prepared by immobilizing glass fibers within an epoxy resin or the like.

However, if a pipe is formed of an insulator such as a GFRP, then an electrical charge generated by flow electrification between the GFRP and the fuel tends to accumulate on the GFRP. As a result, the danger of a static electricity spark acting as an ignition source for the fuel cannot be ignored.

The present invention has been developed in light of these circumstances, and has an object of providing an aircraft fuel tank that is capable of suppressing the occurrence of sparks on a pipe caused by the flow of a lightning current through the pipe during a lightning strike, and also suppressing static electricity charging of a pipe caused by flow electrification generated by the fuel.

Solution to Problem

In order to achieve the object described above, the present invention adopts the aspects described below.

One aspect of the present invention provides an aircraft fuel tank in which a storage section is formed using conductive skins and spars, the fuel tank comprising a pipe that is disposed inside the storage section and is earthed at a plurality of locations, and a pipe outer surface layer having semiconductor properties that is formed in an integrated manner on the outer surface of the pipe.

According to this aspect, because the pipe outer surface layer having semiconductor properties is formed in an integrated manner on the outer surface of the pipe, the outer surface of the pipe has a greater resistance than the conductive skins and spars. As a result, regardless of how the pipe is bonded to the airframe structure, the flow of a lightning current into the pipe during a lightning strike can be suppressed.

Further, even if, for example, flow electrification occurs between the fuel inside the fuel tank and the outer surface of the pipe, because the pipe outer surface layer conducts electricity better than an insulator, any electrical charge that accumulates on the outer surface of the pipe due to flow electrification caused by the fuel can be readily diffused. As a result, static electricity sparks that can act as an ignition source for the fuel can be suppressed.

In this manner, because the occurrence of sparks caused by the flow of a lightning current can be suppressed, and static electricity sparks caused by flow electrification generated by the fuel can also be suppressed, the level of safety can be improved.

A semiconductor such as a silicon carbide (SiC)-based semiconductor, germanium-based semiconductor, gallium arsenide (GaAs)-based semiconductor, gallium arsenide phosphorus-based semiconductor, or gallium nitride (GaN)-based semiconductor can be used as the pipe outer surface layer.

Furthermore, fibers having semiconductor properties that have been prepared by subjecting any of various insulating inorganic fibers or organic fibers to a slight conductive treatment, such as the incorporation of a conductive powder or the performing of a surface conductivity treatment, may also be used.

In the aspect described above, the pipe outer surface layer preferably has a resistance value between adjacent earth locations of not less than $10^3\Omega$ and not more than $10^9\Omega$.

If the resistance value between adjacent earth locations exceeds $10^9\Omega$, then the diffusion of static electricity between the adjacent earth locations may be insufficient, and there is a possibility that the charge potential may increase, causing a static electricity spark.

On the other hand, if the resistance value between adjacent earth locations is less than $10^3\Omega$, then there is an increased danger of a lightning current flowing into the pipe during a lightning strike.

In terms of further improving safety, the maximum value for this resistance value is preferably $10^8\Omega$. Further, in terms of further improving safety, the minimum value for the resistance value is preferably $10^4\Omega$, and a value of $10^5\Omega$ is even more safe.

In the aspect described above, the pipe may have a structure comprising a pipe inner surface layer having semiconductor properties formed in an integrated manner on the inner surface of the pipe.

For example, in a pipe that supplies fuel, the fuel flows through the inside of the pipe. In the structure described above, because the pipe comprises the pipe inner surface layer having semiconductor properties formed in an integrated manner on the inner surface of the pipe, electrical charge that accumulates on the inner surface of the pipe due to flow electrification between the inner surface of the pipe and the fuel flowing through the pipe can be readily diffused. As a result, static electricity sparks that can act as an ignition source for the fuel can be suppressed.

Further, depending on the type of pipe connection that is employed, structures may be formed in which a lightning current is able to flow onto the inner surface of the pipe, but because the inner surface layer has a greater resistance than the conductive skins and spars, even in this case, flow of the lightning current from a skin into the pipe during a lightning strike can be suppressed.

In the aspect described above, the pipe inner surface layer preferably exhibits a resistance value, from a position corresponding with the center of the pipe material in the longitudinal direction to an earth location, of not less than $10^3\Omega$ and not more than $10^9\Omega$.

If the resistance value from the center of the pipe material to an earth location exceeds $10^9\Omega$, then the diffusion of static electricity may be insufficient, and there is a possibility that, for example, the charge potential may increase due to flow electrification, causing a static electricity spark.

On the other hand, if the resistance value from the center of the pipe material to an earth location is less than $10^3\Omega$, then there is an increased danger of a lightning current flowing into the pipe during a lightning strike.

In terms of further improving safety, the maximum value for this resistance value is preferably $10^8\Omega$. Further, in terms of further improving safety, the minimum value for the resistance value is preferably $10^4\Omega$, and a value of $10^5\Omega$ is even more safe.

The term "pipe material" refers to a material that is connected together using ferrules or the like to form a pipe. The pipe inner surface layer is earthed to the pipe outer surface layer, for example, via a ferrule.

Advantageous Effects of Invention

According to the present invention, a pipe outer surface layer having semiconductor properties is formed in an integrated manner on the outer surface of the pipe, and therefore regardless of how the pipe is bonded to the airframe structure, the flow of a lightning current from the airframe structure into the pipe during a lightning strike can be suppressed.

Further, even if, for example, flow electrification occurs between the fuel inside the fuel tank and the outer surface of the pipe, any electrical charge that accumulates on the outer surface of the pipe due to the flow electrification caused by the fuel can be readily diffused, meaning static electricity sparks that can act as an ignition source for the fuel can be suppressed.

DESCRIPTION OF EMBODIMENTS

A fuel tank 1 formed within an aircraft wing according to an embodiment of the present invention is described below with reference to FIG. 1 to FIG. 3.

Figure 1:
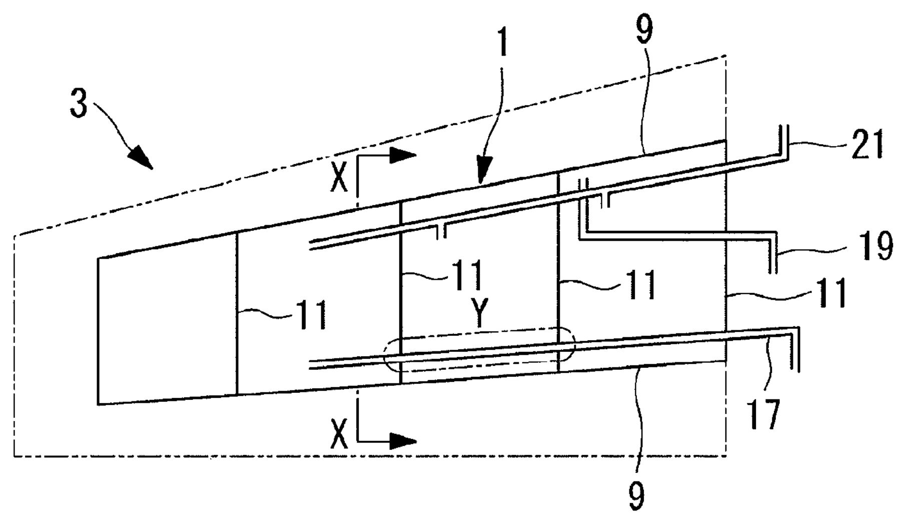
FIG. 1 A plan sectional view schematically illustrating the structure of a fuel tank 1 according to an embodiment of the present invention.
Figure 2:
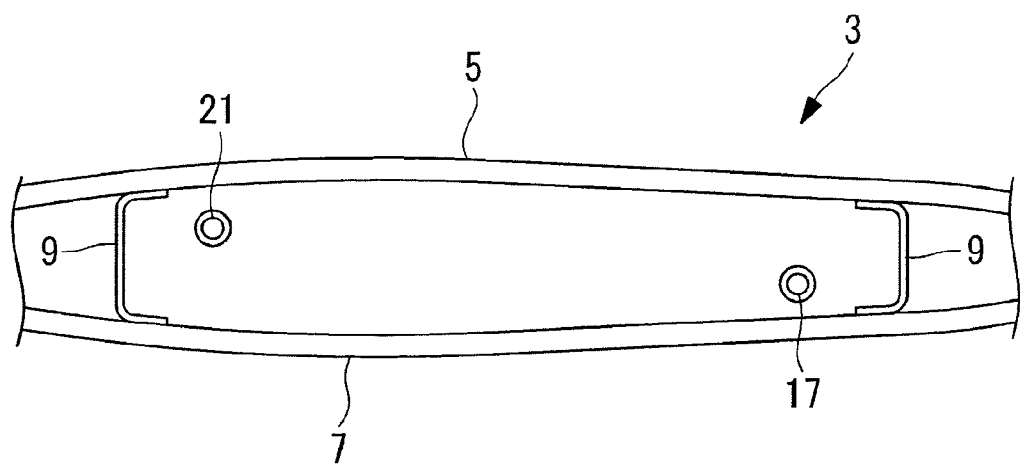
FIG. 2 A side sectional view along the line X-X in FIG. 1.

FIG. 1 is a plan sectional view schematically illustrating the structure of a fuel tank 1 of a left wing. FIG. 2 is a side sectional view along the line X-X in FIG. 1. FIG. 3 is a side sectional view illustrating an enlargement of the section Y in FIG. 1.

The fuel tank 1 is an integral tank that utilizes structural members of the aircraft itself, and is provided inside a left wing 3.

The main members that constitute the structure of the left wing 3 include an upper skin (skin) 5, a lower skin (skin) 7, spars 9 and ribs 11. The upper skin (skin) 5, the lower skin (skin) 7 and the spars 9 are formed, for example, from a carbon fiber reinforced plastic (CFRP) prepared by immobilizing carbon fibers within an epoxy resin, and exhibit conductivity.

In the fuel tank 1, each of the storage sections of the present invention is compartmentalized top and bottom by the upper skin 5 and the lower skin 7, is compartmentalized front and rear by the front and rear spars 9, and is compartmentalized along the wing longitudinal direction by a wing tip-side rib 11 and a wing base-side rib 11.

The fuel tank 1 is partitioned and divided into a number of sections by the ribs 11.

Inside the fuel tank 1 are installed, for example, a refuel pipe (pipe) 17 for replenishing the fuel, an engine feed pipe (pipe) 19 for feeding the fuel to an engine, and an inert gas pipe (pipe) 21 for supplying an explosion-preventing inert gas.

The refuel pipe 17 and the inert gas pipe 21 and the like are attached to the airframe structure using clamps or the like, and are earthed 27. The spacing between earth locations is, for example, 50 cm.

Figure 3:
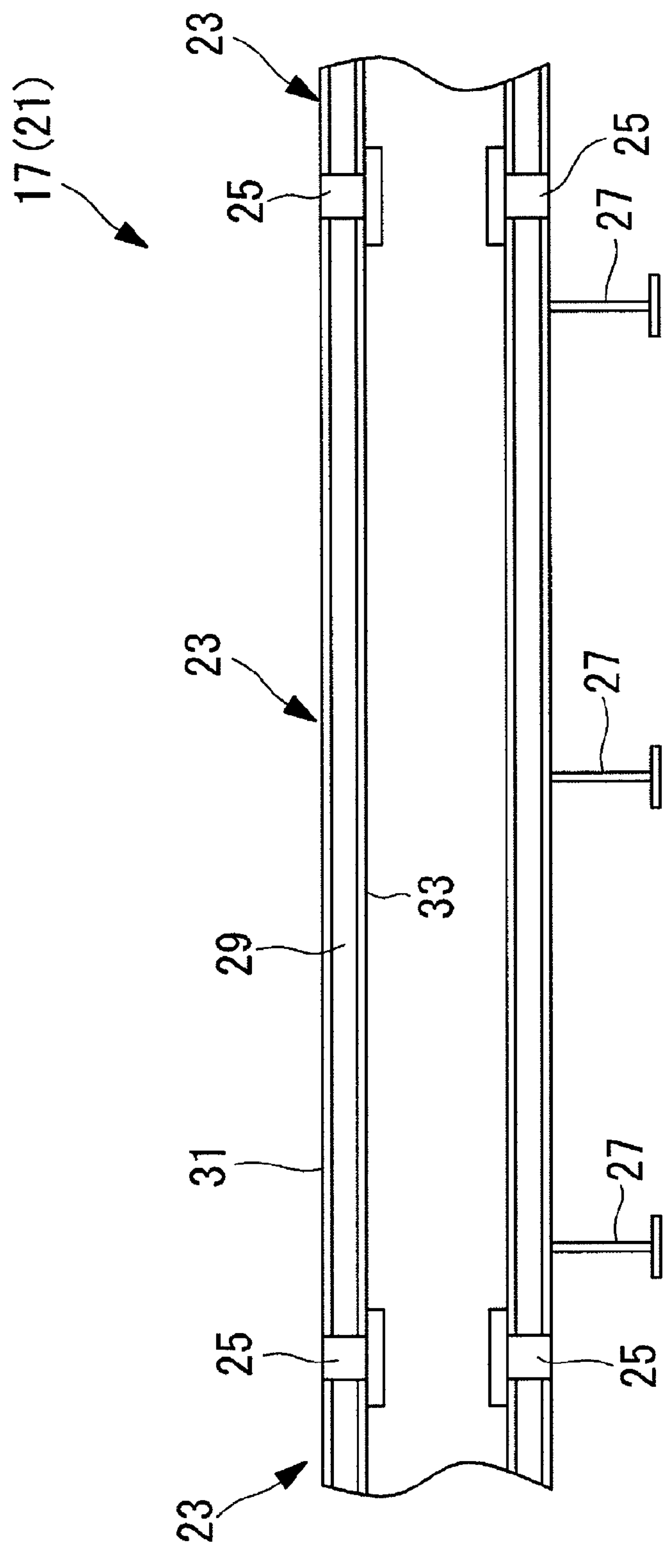
FIG. 3 A side sectional view illustrating an enlargement of the section Y in FIG. 1.

As illustrated in FIG. 3, the refuel pipe 17 and the inert gas pipe 21 and the like are formed by joining a plurality of pipe materials 23 using ferrules 25. The ferrules 25 are formed, for example, from an aluminum alloy.

Each of the pipe materials 23 comprises a hollow circular cylindrical base structure section 29, a pipe outer surface layer 31 having semiconductor properties that is formed in an integrated manner on the outer surface of the base structure section 29, and a pipe inner surface layer 33 having semiconductor properties that is formed in an integrated manner on the inner surface of the base structure section 29.

Accordingly, the outer surface and inner surface of the refuel pipe 17 and the inert gas pipe 21 and the like are formed from the pipe outer surface layer 31 and the pipe inner surface layer 33 respectively, both of which exhibit semiconductor properties.

Further, the pipe outer surface layer 31 and the pipe inner surface layer 33 having semiconductor properties are connected electrically at the ferrule locations. In other words, the pipe inner surface layer 33 is earthed to the pipe outer surface layer 31 via the ferrules.

The base structure section 29 is formed, for example, from a GFRP having insulating properties. The pipe outer surface layer 31 and the pipe inner surface layer 33 are formed, for example, using a prepreg in which a woven fabric of Tyranno fiber (a registered trademark) is impregnated with an epoxy resin, wherein this prepreg is integrated with the base structure section 29 and cured. Alternatively, the pipe outer surface layer 31 and the pipe inner surface layer 33 may be formed by wrapping Tyranno fiber (a registered trademark) or a woven fabric of Tyranno fiber around the base structure section, subsequently impregnating the fiber with a resin to form an integrated structure, and then curing the resin.

The resistance value between adjacent earth locations 27 on the pipe outer surface layer 31 is set, for example, to 1 MΩ.

With this type of structure, even if only the pipe outer surface layer 31 is considered, the electrical current flowing through the pipe is suppressed to 10 mA or less, even for a maximum potential gradient of 20 kV/m.

The resistance value between adjacent earth locations 27 on the pipe outer surface layer 31, and the resistance value from a position on the pipe inner surface layer 33 corresponding with the center of the pipe material 23 in the longitudinal direction to an earth location, are both selected appropriately within a range from not less than $10^3\Omega$ to not more than $10^9\Omega$.

In order to achieve superior safety, these resistance values are preferably not less than $10^4\Omega$ and not more than $10^8\Omega$, and are most preferably not less than $10^5\Omega$ and not more than $10^8\Omega$.

Further, the semiconductor used for forming the pipe outer surface layer 31 and the pipe inner surface layer 33 is not limited to a silicon carbide (SiC)-based semiconductor, and germanium-based semiconductors, gallium arsenide (GaAs)-based semiconductors, gallium arsenide phosphorus-based semiconductors, and gallium nitride (GaN)-based semiconductors and the like may also be used. Further, the pipe outer surface layer 31 or the pipe inner surface layer 33 may employ fibers having semiconductor properties that have been prepared by subjecting any of various insulating inorganic fibers or organic fibers to a slight conductive treatment, such as the incorporation of a conductive powder or the performing of a surface conductivity treatment.

Other pipes inside the fuel tank, such as the engine feed pipe 19, may have substantially the same structure as the refuel pipe 17 and the inert gas pipe 21.

Further, the inert gas pipe 21 may be formed so that, for example, the pipe outer surface layer 31 is formed only on the outer surface that contacts the fuel, but no pipe inner surface layer 33 is formed on the inner surface which does not contact the fuel.

The fuel tank 1 having the type of structure described above has the following actions and effects.

A pipe outer surface layer 31 having semiconductor properties is formed in an integrated manner on the outer surface of each of the pipes installed inside the fuel tank, such as the refuel pipe 17, the engine feed pipe 19 and the inert gas pipe 21, and therefore the outer surfaces of these pipes, namely the pipe outer surface layers 31, have a greater resistance than the upper skin 5, the lower skin 7 and the spars 9, which are formed from a conductive CFRP.

As a result, regardless of how the pipes inside the fuel tank such as the refuel pipe 17, the engine feed pipe 19 and the inert gas pipe 21 are bonded to the airframe structure, the flow of a lightning current, during a lightning strike, from the airframe structure into the pipes inside the fuel tank, such as the refuel pipe 17, the engine feed pipe 19 and the inert gas pipe 21, can be suppressed.

The outer surfaces of the refuel pipe 17, the engine feed pipe 19 and the inert gas pipe 21 and the like make contact with the fuel stored inside the fuel tank 1. For example, when the fuel inside the fuel tank 1 is moved, flow electrification is generated with the pipe outer surfaces of the refuel pipe 17, the engine feed pipe 19 and the inert gas pipe 21 and the like.

However, because the pipe outer surface layer 31 on the refuel pipe 17, the engine feed pipe 19 and the inert gas pipe 21 and the like conducts electricity better than an insulator, any electrical charge that accumulates on the outer surface of the refuel pipe 17, the engine feed pipe 19 and the inert gas pipe 21 due to flow electrification caused by the fuel can be readily diffused.

As a result, static electricity sparks that can act as an ignition source for the fuel can be suppressed.

In this manner, because the occurrence of sparks caused by the flow of a lightning current can be suppressed, and static electricity sparks caused by flow electrification generated by the fuel stored inside the fuel tank 1 can also be suppressed, the level of safety can be improved.

In the case of fuel pipes such as the refuel pipe 17 and the engine feed pipe 19, fuel flows through the inside of the pipe. In the refuel pipe 17 and the engine feed pipe 19, because the pipe comprises a pipe inner surface layer 33 having semiconductor properties formed in an integrated manner on the inner surface of the pipe, electrical charge that accumulates on the inner surface of the refuel pipe 17 or the engine feed pipe 19 due to flow electrification between the inner surface of the refuel pipe 17 or the engine feed pipe 19 and the fuel flowing through the pipe can be readily diffused. As a result, static electricity sparks that can act as an ignition source for the fuel can be suppressed.

Because fuel does not usually flow through the inside of the inert gas pipe 21, a pipe inner surface layer 33 need not necessarily be formed inside the inert gas pipe 21.

Depending on the type of pipe connection that is used for the pipes inside the fuel tank such as the refuel pipe 17, the engine feed pipe 19 and the inert gas pipe 21, structures may be formed that enable a lightning current to flow onto the inner surface of the pipe. However, because the pipe inner surface layer 33 has a greater resistance than the upper skin 5, the lower skin 7 and the spars 9, which are formed from a conductive CFRP, even in such cases, flow of the lightning current, during a lightning strike, from the airframe structure into the pipes inside the fuel tank such as the refuel pipe 17, the engine feed pipe 19 and the inert gas pipe 21, can be suppressed.

At this time, if the resistance value between adjacent earth locations 27 on the pipe outer surface layer 31, or the resistance value from a position on the pipe inner surface layer 33 corresponding with the center of the pipe material 23 in the longitudinal direction to an earth location exceeds $10^9\Omega$, then the diffusion of static electricity may be insufficient, and there is a possibility that the charge potential may increase, causing a static electricity spark.

On the other hand, if the resistance value between adjacent earth locations 27 on the pipe outer surface layer 31, or the resistance value from a position at the center of the pipe material 23 in the longitudinal direction to an earth location is less than $10^3\Omega$, then there is an increased danger of a lightning current flowing into the pipe during a lightning strike.

In terms of further improving safety, the maximum value for these resistance values is preferably $10^8\Omega$. Further, in terms of further improving safety, the minimum value for these resistance values is preferably $10^4\Omega$, and a value of $10^5\Omega$ is even more safe.

The present invention is not limited by the embodiment described above, and appropriate modifications can be made without departing from the scope of the present invention.

REFERENCE SIGNS LIST

1 Fuel tank
3 Main wing

5 Upper skin
7 Lower skin
9 Spar
11 Rib
17 Refuel pipe
19 Engine feed pipe
21 Inert gas pipe
23 Pipe material
25 Ferrule
27 Earth
29 Base structure section
31 Pipe outer surface layer
33 Pipe inner surface layer

The invention claimed is:

1. An aircraft fuel tank in which a storage section is formed using conductive skins and spars, the fuel tank comprising:

a pipe that is disposed inside the storage section and is grounded at a plurality of locations, and a pipe outer surface layer having electrical properties of a semiconductor, wherein an outer surface of the pipe is formed from the pipe outer surface layer, and wherein the pipe outer surface layer has an electrical resistance greater than resistances of the skins and spars and smaller than a resistance of an insulator.

2. The aircraft fuel tank according to claim 1, wherein the pipe outer surface layer exhibits a resistance value between adjacent grounded locations of not less than $10^3\Omega$ and not more than $10^9\Omega$.

3. The aircraft fuel tank according to claim 1, wherein the pipe comprises a pipe inner surface layer having electrical properties of a semiconductor, wherein an inner surface of the pipe is formed from the pipe inner surface layer, and wherein the pipe inner surface layer has an electrical resistance greater than the resistances of the skins and spars and smaller than a resistance of an insulator.

4. The aircraft fuel tank according to claim 3, wherein the pipe inner surface layer exhibits a resistance value, from a position corresponding with a center of the pipe material in a longitudinal direction to a grounded location, of not less than $10^3\Omega$ and not more than $10^9\Omega$.

* * * * *